(12) United States Patent
Carlen et al.

(10) Patent No.: US 6,800,109 B1
(45) Date of Patent: Oct. 5, 2004

(54) ORGANIC WASTE TREATMENT SYSTEM

(76) Inventors: Adelbert Carlen, 21801 Gresham St., West Hills, CA (US) 91304; Manuel Diaz, 21801 Gresham St., West Hills, CA (US) 91304

(*) Notice: Subject to any disclaimer, the term of this patent is extended or adjusted under 35 U.S.C. 154(b) by 250 days.

(21) Appl. No.: 10/139,077

(22) Filed: May 3, 2002

(51) Int. Cl.$^7$ .................................................. C05F 7/00
(52) U.S. Cl. .............................................. 71/12; 71/13
(58) Field of Search ....................................... 71/12, 13

(56) References Cited

U.S. PATENT DOCUMENTS

| | | | | |
|---|---|---|---|---|
| 3,939,280 A | * | 2/1976 | Karnemaat | 426/2 |
| 3,960,718 A | * | 6/1976 | Lebo | 210/758 |
| 4,078,094 A | * | 3/1978 | Katzen | 426/641 |
| 4,191,549 A | * | 3/1980 | Boyko | 588/205 |
| 4,369,199 A | * | 1/1983 | Katzen | 426/641 |
| 5,378,257 A | * | 1/1995 | Higashida | 71/12 |
| 5,385,673 A | * | 1/1995 | Fergen | 210/710 |
| 5,422,015 A | * | 6/1995 | Angell et al. | 588/257 |
| 5,486,068 A | * | 1/1996 | Wilson | 405/129.25 |
| 6,312,492 B1 | * | 11/2001 | Wilson | 71/21 |

* cited by examiner

*Primary Examiner*—C. Sayala
(74) *Attorney, Agent, or Firm*—Goldstein Law Offices, P.C.

(57) ABSTRACT

An organic waste treatment process, for treating pathogen containing organic sludge and producing pathogen free liquid acidic fertilizer. Concentrated sulfuric acid is added to the organic sludge on a one-to-one basis with solids contained within the sludge. The concentrated sulfuric acid reacts with the organic sludge to neutralize pathogens by carbonizing the sludge, pasteurizing the sludge through heat of hydration, and chemically disinfecting the sludge through the production of sulfur dioxide. An efficient acidic liquid fertilizer is created by neutralizing the pathogens, by reacting with phospholipids and proteins to create phosphoric acid and nitric acid, and by a reduction in mass and volume through the production of waste gases that are allowed to escape.

5 Claims, No Drawings

ORGANIC WASTE TREATMENT SYSTEM

BACKGROUND OF THE INVENTION

The invention relates to an organic waste treatment system. More particularly, the invention relates to a system for treating pathogen containing organic waste, by which all pathogens are killed, and the waste is carbonized to produce a pathogen free acidic fertilizer.

Organic sludge, most commonly "sewerage sludge" has traditionally created a disposal problem. However, in recent decades, attempts have been made to use the organic sludge as fertilizer. The main problem is using organic sludge is that it tends to contain pathogens which are harmful to humans and animals. Generally, the organic sludge is first processed through composting, such that heat generated during composting kills most parasites. However, composting is not fully effective in eliminating all harmful pathogens and parasites. In particular, the Ascaris Helminthes worm is a common parasite often found in organic sludge which can inhabit the intestines of humans and animals, but is generally not killed during composting.

Thus, when organic sludge is not completely sterilized, and is subsequently used as a fertilizer, significant danger exists. In particular, humans and domestic animals in farming communities are placed in direct jeopardy. Further, when organic sludge is used as a fertilizer there is a significant risk of contaminating the food chain and creating a wide reaching problem.

Although the Environmental Protection Agency has set criteria for the treatment, and subsequent reuse of organic sludge (see 40 CFR, parts 257 and 503), more stringent regulation is probably needed. However, in order to meet such prospective stringent regulations, a process must be developed which completely eliminates pathogens in organic sludge.

Other prior art attempts have been made to address the problem of pathogen reduction.

U.S. Pat. No. 6,312,492 to Wilson infuses animal manure with concentrated sulfuric acid and pine oil, dries the product, and uses it as a soil conditioner.

U.S. Pat. No. 5,422,015 employs an acid-base pair to disinfect pathogen containing organic sludge. The heat of hydration is used to attempt to pasteurize the organic sludge. However, this process does not teach the total destruction of the pathogen by carbonization. The process also increases the mass and volume of the organic sludge.

U.S. Pat. No. 5,378,257 to Higashida mixes nitric acid and quicklime with sewage to produce fertilizer.

U.S. Pat. No. 4,078,094 to Katzen uses an acid solution to react with a basic component in animal manure to form a soluble salt. The heat of hydration produced by the reaction is the basis for the attempted sterilization of the manure. U.S. Pat. No. 3,939,280 to Karnemaat uses acid, formaldehyde and urea to sterilize animal waste.

U.S. Pat. No. 4,369,199 to Katzen and U.S. Pat. No. 3,960,718 to Lebo both teach using acid to lower the pH of the organic material to 3 or 4 to destroy pathogenic bacteria and stop the production of unhealthy gases. However, neither process teaches the total destruction of pathogens by carbonization.

However, none of these systems ensure the total destruction of the pathogen, volume reduction of the organic sludge, the elimination of odors. Further, none have presented an economically viable solution.

Thus, while these units may be suitable for the particular purpose employed, or for general use, they would not be as suitable for the purposes of the present invention as disclosed hereafter.

SUMMARY OF THE INVENTION

It is an object of the invention to provide a system for processing organic sludge which completely eliminates pathogens within the sludge. Accordingly, the process fully carbonizes the organic sludge, as well as sterilizing and disinfecting the organic sludge, killing all living organic matter in the process.

It is another object of the invention to provide a system which produces acidic liquid fertilizer. Accordingly, the carbonization results in an effective, liquid fertilizer product, and the production of nitric and phosphoric acid increases the acidity of the fertilizer.

It is a further object of the invention to provide a system produces concentrated fertilizer whereby the mass and volume of the organic sludge is reduced so that the resulting fertilizer can be handled and transported more economically. Accordingly, the reaction of the present invention produces gases which are allowed to escape and result in a net reduction of mass and volume of the resultant liquid fertilizer.

The invention is an organic waste treatment process, for treating pathogen containing organic sludge and producing pathogen free liquid acidic fertilizer. Concentrated sulfuric acid is added to the organic sludge on a one-to-one basis with solids contained within the sludge. The concentrated sulfuric acid reacts with the organic sludge to neutralize pathogens by carbonizing the sludge, pasteurizing the sludge through heat of hydration, and chemically disinfecting the sludge through the production of sulfur dioxide. An efficient acidic liquid fertilizer is created by neutralizing the pathogens, by reacting with phospholipids and proteins to create phosphoric acid and nitric acid, and by a reduction in mass and volume through the production of waste gases that are allowed to escape.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

DETAILED DESCRIPTION OF THE PREFERRED EMBODIMENTS

According to the present invention, a system is provided for processing organic sludge, which is most commonly sewage waste, but may also be treated sewage sludge, animal carcasses, and infectious hospital waste. Organic sludge, as defined herein is generally 20% solids, and 80% water. The solids include all organic material in the organic waste, including pathogens.

Further in accordance with the present invention, concentrated sulfuric acid ($H_2SO_4$) is combined with the organic waste to carbonize the organic waste. The main reaction follows the equation:

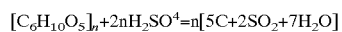

$$[C_6H_{10}O_5]_n + 2nH_2SO^4 = n[5C + 2SO_2 + 7H_2O]$$

Further, the cell membrane of pathogens within the organic waste is ruptured by the carbonization process. The water within the cell is released, hydrating the concentrated sulfuric acid, and releasing a significant heat of hydration, which acts to sterilize pathogens within the organic sludge.

Accordingly, during the reaction, sulfur dioxide gas is produced. The sulfur dioxide gas further acts to chemically disinfect the organic sludge. Thus, a combination of the carbonization, heat of hydration, and sulfur dioxide production ensure complete destruction of all pathogens within the sludge.

Further, during the carbonization, phosphate in the cell membrane phospholipids react with the concentrated sulfuric acid to produce phosphoric acid. The proteins within the organic sludge are oxidized by the concentrated sulfuric acid to produce nitric acid. All such stray reactions thus create by-products which lower the pH and are thereby consistent with the use as a liquid acidic organic fertilizer. In addition, referring to the main reaction, sulfur dioxide ($SO_2$), carbon dioxide ($CO_2$), and water vapor ($H_2O$) are produced. In fact, the heat of hydration can actually boil the organic sludge and further enhance the escape of water in the form of vapor. As such products escape into the atmosphere, there is a reduction of volume and mass of the resulting liquid acidic organic fertilizer. Accordingly, the remaining liquid fertilizer product is concentrated, and is because of its reduced mass and volume is more economical to handle and transport.

To ensure complete carbonization, the concentrated sulfuric acid should be combined on a 1:1 basis with the solids in the organic sludge. Adding diluted sulfuric acid will not result in the complete carbonization of the organic sludge. Since organic solids generally comprise 20% of the organic sludge, the sulfuric acid is combined with the sludge on a 1:5 basis. In addition, for the purpose of the present invention, concentrated sulfuric acid and oil of vitriol are used interchangeably.

In conclusion, herein is presented a system for processing organic sludge and other organic waste whereby pathogens are eliminated through the complete carbonization of the sludge, as well as heat sterilization and chemical disinfection thereof. The organic sludge is made suitable for use as a liquid acidic fertilizer through the elimination of pathogens, reduction of mass and volume, and the increase of acidity through the production of phosphoric acid and nitric acid. The invention may be embodied in the form illustrated in the accompanying description. However, numerous variations are possible while adhering to the inventive concept. Such variations are contemplated as being a part of the present invention.

What is claimed is:

1. A method for producing pathogen free liquid fertilizer from organic sludge, the organic sludge containing substantially 20% solids and 80% water, the organic sludge containing phospholipids, comprising the steps of:

carbonizing the organic sludge into liquid fertilizer by adding concentrated sulfuric acid to the sludge in an amount equal to one fifth the mass of the organic sludge, the quantity of concentrated sulfuric acid substantially equaling by mass the solids of the organic sludge; and producing phosphoric acid by reacting the concentrated sulfuric acid with the phospholipids, wherein the step of carbonizing the organic sludge further comprises:

reducing the mass of the carbonized sludge by producing sulfur dioxide and carbon dioxide;

chemically disinfecting the organic sludge with the sulfur dioxide;

allowing the sulfur dioxide and carbon dioxide to escape from the liquid fertilizer;

producing heat by hydration as water within the organic sludge hydrates the concentrated sulfuric acid;

sterilizing the organic sludge with the heat of hydration; and reducing the mass of the carbonized sludge by allowing the organic sludge to boil by the heat of hydration and by allowing heated water vapor to escape.

2. The method for producing pathogen free liquid fertilizer as recited in claim 1, wherein the organic sludge contains proteins, and further comprising the step of:

producing nitric acid by reacting the concentrated sulfuric acid with the proteins.

3. A method for killing pathogens in organic sludge containing solids and water, the organic sludge containing proteins, comprising the steps of:

carbonizing the solids by mixing concentrated sulfuric acid with the organic sludge;

producing heat of hydration as the water in the organic sludge hydrates the concentrated sulfuric acid;

chemically disinfecting the sludge by producing sulfur dioxide as the sludge is carbonized;

reducing the mass of the sludge by allowing sulfur dioxide and water vapor to escape;

producing liquid fertilizer by the steps of carbonizing, disinfecting, reducing in mass, and pasteurizing the organic sludge; and producing nitric acid by reacting the proteins with the concentrated sulfuric acid, wherein the step of producing heat of hydration further comprises pasteurizing the organic sludge by boiling the organic sludge through the heat of hydration.

4. The method for killing pathogens as recited in claim 3, wherein the organic sludge is substantially 20 percent solids, and wherein the step of carbonizing the solids by mixing concentrated sulfuric acid with the organic sludge further comprises adding an equal amount of sulfuric acid by mass to the solids.

5. The method killing pathogens as recited in claim 4, wherein the organic sludge contains phospholipids, and further comprising the step of:

producing phosphoric acid by reacting the concentrated sulfuric acid with the phospholipids.

\* \* \* \* \*